(12) United States Patent
Chen et al.

(10) Patent No.: US 9,305,207 B2
(45) Date of Patent: Apr. 5, 2016

(54) DEPTH-PHOTOGRAPHING METHOD OF DETECTING HUMAN FACE OR HEAD

(71) Applicants: Tien-Hsiang Chen, Taichung (TW); Yu-Chao Liang, Taipei (TW); Wen-Chin Chang, Taipei (TW)

(72) Inventors: Tien-Hsiang Chen, Taichung (TW); Yu-Chao Liang, Taipei (TW); Wen-Chin Chang, Taipei (TW)

(73) Assignees: Vincent Giale Luong, Newark, CA (US); ARIMAXPOWER, LLC, Newark, CA (US); Hsueh-Fang Shih, Changhua County (TW); Tien-Hsiang Chen, Taichung (TW); Yu-Chao Liang, Taipei (TW); Wen-Chin Chang, Taipei (TW)

( * ) Notice: Subject to any disclaimer, the term of this patent is extended or adjusted under 35 U.S.C. 154(b) by 233 days.

(21) Appl. No.: 13/918,820

(22) Filed: Jun. 14, 2013

(65) Prior Publication Data
US 2013/0336548 A1  Dec. 19, 2013

(30) Foreign Application Priority Data

Jun. 18, 2012 (TW) .............................. 101121805 A

(51) Int. Cl.
*G06K 9/00* (2006.01)
*H04W 52/02* (2009.01)

(52) U.S. Cl.
CPC ....... *G06K 9/00288* (2013.01); *H04W 52/0251* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,810,135 B1 * | 10/2004 | Berenz ............... | G06K 9/00248 280/735 |
| 8,261,090 B1 * | 9/2012 | Matsuoka ...................... | 713/186 |
| 2006/0097172 A1 * | 5/2006 | Park ........................... | 250/338.1 |
| 2008/0303915 A1 * | 12/2008 | Omi ........................... | 348/222.1 |
| 2013/0207970 A1 * | 8/2013 | Shpunt .................... | G06T 15/00 345/419 |
| 2013/0342813 A1 * | 12/2013 | Wang ................. | G02B 27/2235 353/7 |

* cited by examiner

*Primary Examiner* — Nirav G Patel
(74) *Attorney, Agent, or Firm* — Lin & Associates Intellectual Property, Inc.

(57) ABSTRACT

A depth-photographing method of detecting human face or head includes the steps of using the specific light to illuminate the target under an environmental light, receiving and detecting the reflected light from the target with the detector, generating first depth detecting information corresponding to the depth of the target, turning off the specific light, detecting another reflected light from the target, generating second depth detecting information corresponding to the depth of the target, performing the detection/calculation process based on the first and second depth detecting information to generate the appearance of the target, determining if the appearance of the target represents a human face or head, and if yes, generating depth-photographing detection information used to cancel a lock state, thereby avoiding unintentionally entering power saving (or standby mode), speeding up entering the desired power saving or dynamically changing/adjusting the display content.

4 Claims, 2 Drawing Sheets

DEPTH-PHOTOGRAPHING METHOD OF DETECTING HUMAN FACE OR HEAD

CROSS-REFERENCES TO RELATED APPLICATIONS

This application claims the priority of Taiwanese patent application No. 101121805, filed on Jun. 18, 2012, which is incorporated herewith by reference.

BACKGROUND OF THE INVENTION

1. Field of the Invention

The present invention generally relates to a depth-photographing method, and more specifically to a depth-photographing method of detecting human face or head by illuminating a target with a specific light, detecting the reflected light from the target with a detector, and generating depth information based on the detected result.

2. The Prior Arts

As the mobile communication or electronic devices become more popular, it is one of the primary goals for the manufacturers to improve the human-machine operation interface. Additionally, most of the devices generally operate with electric power supplied by the batteries, and thus it is crucial to effectively save power consumption during operation.

In the prior arts, power saving mode is usually used for specific operations to reduce most unnecessary power consumption. For example, when the electronic device is kept in the standby mode or idle state over a preset period of time, most power-consuming functions will be shut down, such as the display function, that is, the light source being turned off and the display operation being prohibited. Meanwhile, the user can make the device return to the normal operation mode from the power saving mode by use of some appropriate wakeup or recovery operation, so as to retrieve all normal functions temporarily prohibited, like image display. One of the most common used to recover is that the user needs to push a specific switch or press a specific key, and then a dialog box is popped up to prompt the user to follow the instructions, such as pressing the power key and then the confirmation key. Another example is the sliding unlock operation, which is applied to most of the touch screen devices. Specifically, the user is required to use his/her finger to press and drag an unlock icon/bar shown in the display unit.

One of the shortcomings in the prior arts is that the unlock operation procedure requires the users to press some specific keys in a preset order, and at the same time activate the power-consuming display function. As a result, the power consumption increases and the user has to focus on the instructions shown in the display device. Thus, the above-mentioned traditional unlock operation is complex and confusing, and particularly does not meet the requirement of the user-friendly interface.

Therefore, it needs a new depth-photographing method, which actively uses depth information to generate appearance information of the target, and determines if the target is a human face or head to generate depth photographing detection information for cancelling the lock state, thereby avoiding entering any unintentional power saving mode, speeding up entering the desired power saving mode, or changing/adjusting the display content to overcome the drawbacks in the prior arts.

SUMMARY OF THE INVENTION

The primary object of the present invention is to provide a depth-photographing method of detecting human face or head. The depth-photographing method of detecting human face or head generally comprises: using a specific light to illuminate a target under an environmental light for an illuminating period of time; receiving and detecting the reflected light from the target with a detector; generating first depth detecting information corresponding to the depth based on the intensity of the reflected light; turning off the specific light for a turn-off period of time; detecting another reflected light from the target; generating second depth detecting information corresponding to the depth based on the intensity of the reflected light; performing the detection/calculation process based on the first and second depth detecting information to generate an appearance of the target; determining if the appearance of the target represents a human face or head; and if yes, generating depth-photographing detection information used to cancel a lock state.

Therefore, the method of the present invention is suitable for the electronic device to cancel or release the lock state. Also, it is possible to avoid entering any unintentional power saving (or standby), to speed up entering intentional power saving or to change/adjust the display content for the electronic devices, such as smart phones, tablet, notebook, ATM (auto-teller machine), human face recognition device, entrance guarding device, or monitoring device.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
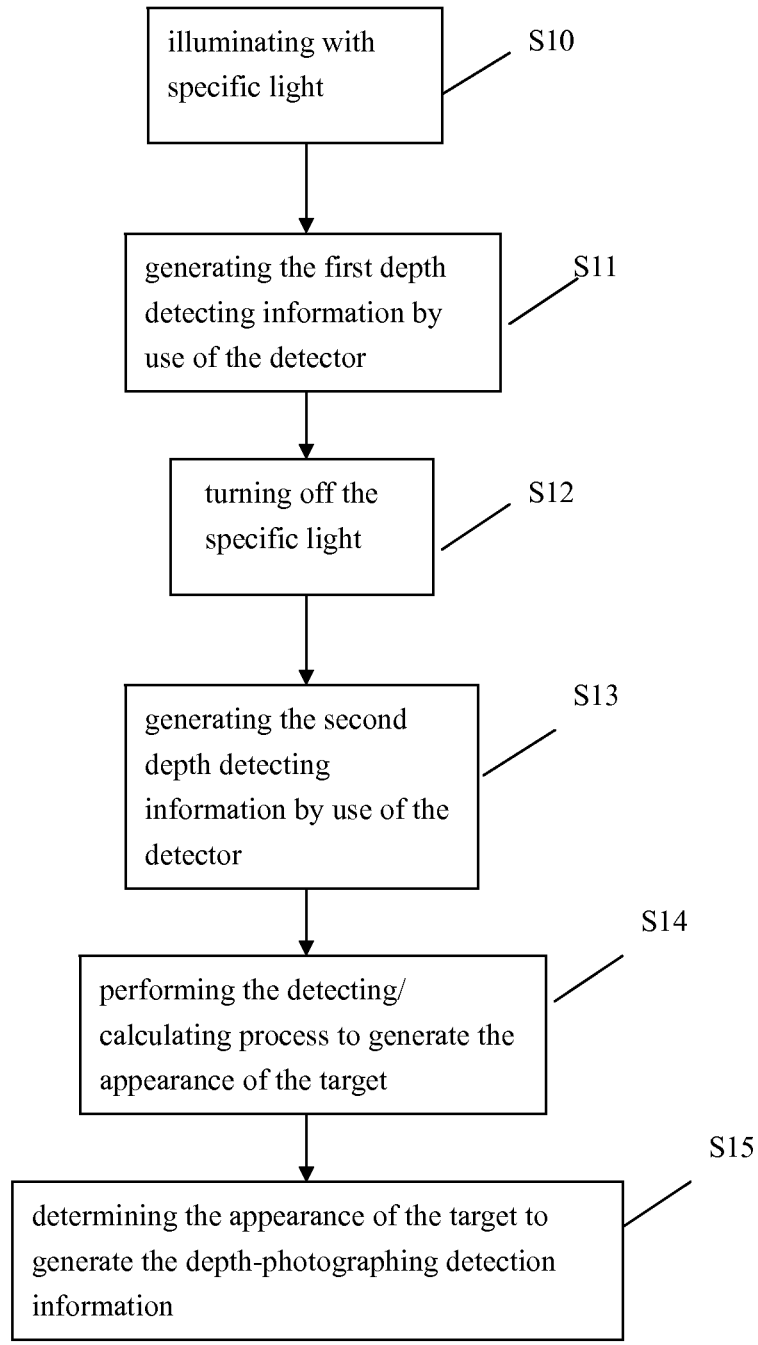
FIG. 1 is a flowchart showing the depth-photographing method of detecting human face or head according to one embodiment of the present invention.

Please refer to FIG. 1 showing the operation flowchart of the depth-photographing method of detecting human face or head according to one embodiment of the present invention. As shown in FIG. 1, the depth-photographing method of the present embodiment comprises the sequential steps S11, S12, S13, S14 and S15 to generate depth photographing detection information.

First, in the step S11, a specific light is used to illuminate a target under an environmental light for an illuminating period of time. The environmental light is generally sunlight, lamp light or fire light, and the target may include a human face or head. The specific light is a visible or invisible light emitted by a light emitting device, such as white light emitted by the light emitting diode (LED) or infrared light emitted by the infrared emitting device.

Next, at least one detector is used to receive and detect a reflected light from the target with respect to the environmental light and the specific light in the step S11. Meanwhile, based on an intensity of the reflected light, first depth detecting information corresponding to the depth of the target is generated. Preferably, the detector is configured on the same side as the light emitting device which generates the specific light, so as to increase the efficiency of receiving the reflected light. For example, the light emitting device and the detector are directed toward the target to generate the specific light and detect the reflected light, respectively. Since the intensity of the reflected light decreases as the distance between the light emitting device and the detector increases, if the background of the target is far away, the intensity of its reflected light becomes weaker, and in contrast, the intensity of the reflected light of the target is stronger. Moreover, the intensity detected by each pixel in the detector is related to the corresponding point on the surface of the target, such that the first depth detecting information actually represents the distribution plane of the intensity of the reflected light, that is, the corresponding depth distribution of the target. The first depth detecting information is substantially considered as depth information of the target.

In the step S12, the specific light is turned off for a turn-off period of time. In other words, the target is illuminated by only the environmental light to generate another reflected light, which contains only the environmental light or contains no visible light.

Subsequently, the step S13 is to receive and detect the another reflected light of the target by the above detector during the turn-off period of time, and generate second depth detecting information corresponding to the depth of the target based on the intensity of the reflected light.

In the step S14, according to the first and second depth detecting information, the appearance of the target is generated by the detecting/calculating process, which comprises the step of subtracting the second depth detecting information from the first depth detecting information to generate depth detecting information corresponding to the specific light. More specifically, the depth detecting information comprises the information about the appearance of the target, that is, the depth detecting information only comprises the information corresponding to the specific light.

Since the background of the target has respectively smaller reflection area than the target, the intensity of the reflecting light of the background is weaker and the intensity of the reflecting light of the target is stronger such that the depth detecting information demonstrates the effect that the target seems projecting (brighter) and the background recessing (darker). For example, if the target is a person and the upper region of the shoulder of the person is the background much far away from the person, both sides out of the face or head of the person are nearly empty because of no large reflection area like the face or head. Even when the face or head is close to some object as the background, such as wall, the intensity of the reflected light from the background is still weaker because the light path going through the space above the shoulder and then reflected is longer than the light path directly reflected by the face or head. In other words, it specially shows "the face is projecting and both right and left sides out of the face are recessing". Similarly, when the viewing angle rotates 90 degrees, it becomes "the face is projecting and both upper and lower sides are recessing".

The above criterion of inspecting/determining the target, that is, "the face is projecting and both right and left sides out of the face are recessing", is sufficient to confirm whether the target under only the environmental light is the face or head of the person. Therefore, another implementation of the step S14 is possibly implemented by using two detectors to photograph the right and left images of the target in the step S12, respectively, and then calculating the depth detecting information based on the right and left images so as to determine if the target is the face of head of the person. As a result, the same function is attained.

Finally, the step S15 is performed to determine/recognize the appearance of the target contained in the depth detecting information, and to generate the depth photographing detection information if the target is confirmed as the face of head of the person from its appearance. The depth photographing detection information generated in the present invention is useful to cancel/release the lock state so as to avoid unintentionally entering the power saving mode, change/adjust the display content, and so on.

Figure 2:
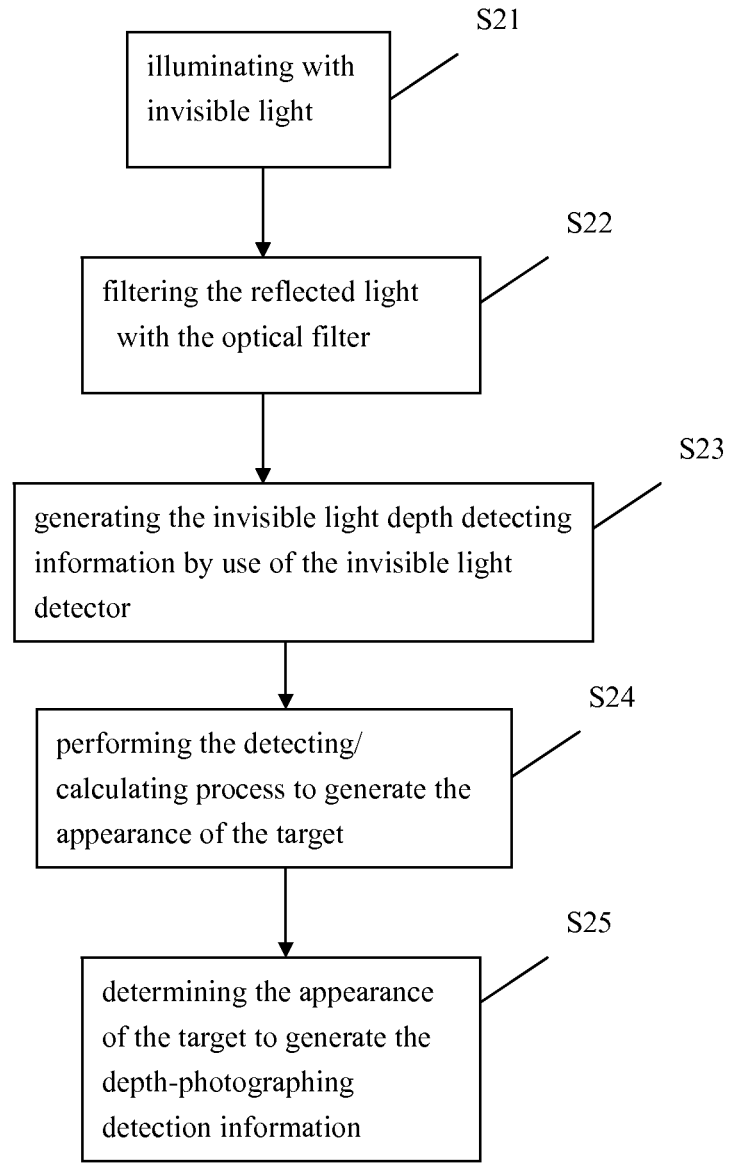
FIG. 2 is a flowchart showing the depth-photographing method of detecting human face or head according to another embodiment of the present invention.

Another preferred embodiment according to the present invention similar to the above embodiment in FIG. 1 is shown in FIG. 2, and comprises the steps S21, S22, S23, S24 and S25. It should be noted that one of the primary differences is that the light source for detecting (e.g. the specific light) in the present embodiment is invisible light.

As shown in FIG. 2, first, the target is illuminated with invisible light, such as infrared light, for an illuminating period of time in the step S21. Then, the reflected light from the target is filtered by the optical filter in the step S22 to generate the filtered light, which is ensured to contain only the component of invisible light. In the step S23, an invisible light detector is used to receive and detect the filtered light, and an invisible light depth detecting information is generated to correspond to the depth of the target based on the intensity of the filtered light.

Subsequently, the detecting/calculating process is performed in the step S25 to generate the appearance of the target based on the invisible light depth detecting information generated in the step S23. Finally, in the step 25, the appearance of the target included in the invisible light depth detecting information is inspected to determine if the target is the face or head of the person, and the depth photographing detection information is generated if the target is the face or head of the person, similar to the step S15 in the previous embodiment.

Additionally, before the step s23, the present embodiment may further comprise determining if the intensity of the reflected light for invisible light is within the predetermined range, and the depth photographing detection information corresponding to the depth of the target is generated only if the intensity of the reflected light is within a predetermined range. Thus, available resources are effectively saved.

From the above-mentioned description, one feature of the present invention is that the depth detecting information related to the depth of the target is used to inspect the appearance of the target, and the depth photographing detection information is thus generated, such that most of the malfunction can be effectively prevented. For instance, as with the planar pattern of the face or head painted, stamped, marked or printed on the planar object, like paper, cloth, clothes, plastic sheet, metal sheet or planar shell body, the depth-photographing method of the present invention can correctly confirm that the target does not have the three-dimensional appearance of the face or head, and the depth photographing detection information is not generated.

Specifically, the depth-photographing method provided by the present invention is suitable for the electronic devices, which needs to cancel or release the lock state and return to the normal preset mode, such as smart phone, tablet PC, notebook, bank ATM, human face recognition device, door guard device, monitor device, and so on. The present invention thus provides the non-contact solution for cancelling the lock state, which can actively determine if the target is the face or head of the person, and the user can successfully cancel the lock state without performing any operation, but just being photographed by the electronic device, like smart phone. That is, the user can face his/her smart phone, and then the smart phone performs the processing steps provided by the present invention as above-mentioned to recognize the user's face or head so as to generate the depth photographing detection information for cancelling the lock state of the smart phone. In particular, it is possible to avoid many potential malfunctions and improve the correctness and the reliability of the normal operation. Meanwhile, it is apparent that the method of the present invention can be applied to speed up entering power saving mode when the target has the appearance of human face or head. Therefore, the power consumption is further saved to keep more electricity available so as to prolong the operation period, reduce the times of recharging and enhance the convenience for the electronic devices.

Another exemplary application for the present invention is described hereafter. When the user employs the display content of the notebook to perform product presentation/demonstration or discuss the contract, and the touch screen, keyboard or mouse of the notebook is not operated for a while, the notebook will not unintentionally enter power saving mode (or standby mode) because the depth photographing detection information generated by the present invention is used to recognize and confirm that the user is close enough to the front of the notebook, that is, the user is still using the notebook. Similar application may include the projector electrically connected to the PC or notebook. Specifically, in case of the projector used in the meeting, when the projector shows the same image for a long period of time and the keyboard, mouse or touch screen of the PC or notebook is not triggered at the same time, it is very common for traditional applications that the PC or notebook is forced to enter power saving mode, and the projector is thus switched to power saving mode to turn off the light source. As a result, the current image shown by the projector disappears. It needs to trigger the keyboard or mouse to turn on the light source of the projector to recover the previous display function. It is apparently seen that the traditional process of recovering from power saving mode is quite confusing and inconvenient. Thus, the present invention can overcome such a problem, and meanwhile avoid unintentionally turning off the light source of the projector.

Furthermore, the display device may also use the depth photographing detection information of the present invention to dynamically change/adjust the display content. For instance, the display device can show larger caption or image when the viewer is moving far away, and show detailed text or finer image when the viewer is getting close. Additionally, the viewer may watch different display contents at various viewing angles. That is, as the viewer is moving from right to left side, the display device may display the prompt text or icons to attract the attention of the viewer when the viewer is at the right or left side, and show the detailed contents, clear patterns or images when the viewer is approximately in front of the display device, thereby attaining the aim of propaganda, marketing or advertisement.

Therefore, the depth-photographing method of the present invention can be further applied to the power-on/interaction function of the mobile communication devices or electronic devices so as to return to the preset normal function or improve the human-machine communication interface. Also, it is clearly apparent that the user can conveniently perform the operation. Similarly, the present invention can be further applied to the electronic field, including smart phone, tablet PC, notebook, bank ATM, human face recognition device, door guard device, monitor device, and so on.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A depth-photographing method of detecting a human face or head for cancelling a lock state, comprising the steps of:
   using a specific light generated by a light emitting device to illuminate a target under an environmental light for an illuminating period of time;
   receiving and detecting a first reflected light from the target with at least one detector;
   generating first depth detecting information corresponding to depth of the target based on an intensity of the first reflected light;
   turning off the specific light for a turn-off period of time;
   using the at least one detector to detect a second reflected light from the target illuminated by only the environmental light;
   generating second depth detecting information corresponding to the depth of the target based on an intensity of the second reflected light;
   performing a detecting/calculating process to generate an appearance of the target based on the first depth detecting information and the second depth detecting information;
   inspecting the appearance of the target; and
   generating depth-photographing detection information for cancelling the lock state if the appearance of the target is determined to be a human face or head;
   wherein the detecting/calculating process comprises a step of subtracting the second depth detecting information from the first depth detecting information to generate depth detecting information corresponding to the specific light, the depth detecting information comprises information related to the appearance of the target, the reflected light decreases as the distance between the light emitting device and the at least one detector increases, the intensity of the reflected light becomes weaker if a background of the target is farther, and the target is determined as being the human face or head when the depth detecting information shows the target as being projecting out of two recessing sides.

2. The depth-photographing method as claimed in claim 1, wherein the specific light is visible or invisible light.

3. A depth-photographing method of detecting a human face or head for cancelling a lock state, comprising the steps of:
   using an invisible light generated by a light emitting device to illuminate a target for an illuminating period of time;
   filtering a reflected light from the target with an optical filter to generate a filtered light without any visible light component;
   using an invisible light detector to receive and detect the filtered light;
   generating invisible light depth detecting information corresponding to the depth of the target based on an intensity of the filtered light;

performing a detecting/calculating process to generate an appearance of the target based on the invisible light depth detecting information;

inspecting the appearance of the target; and generating depth-photographing detection information for cancelling the lock state if the appearance of the target is determined to be a human face or head;

wherein the invisible light depth detecting information generated in the detecting/calculating process comprises information related to the appearance of the target, the reflected light decreases as the distance between the light emitting device and the invisible light detector increases, the intensity of the reflected light becomes weaker if a background of the target is farther, and the target is determined the human face or head when the invisible light depth detecting information shows the target as being projecting out of two recessing sides.

4. A depth-photographing method of detecting a human face or head for cancelling a lock state, comprising the steps of:

using an invisible light generated by a light emitting device to illuminate a target for an illuminating period of time;

filtering a reflected light from the target with an optical filter to generate a filtered light without any visible light component;

using an invisible light detector to receive and detect the filtered light;

generating invisible light depth detecting information corresponding to the depth of the target based on an intensity of the filtered light when the intensity is within a preset range;

performing a detecting/calculating process to generate an appearance of the target based on the invisible light depth detecting information;

inspecting the appearance of the target; and generating depth-photographing detection information for cancelling the lock state if the appearance of the target is determined to be a human face or head;

wherein the invisible light depth detecting information generated in the detecting/calculating process comprises information related to the appearance of the target, the reflected light decreases as the distance between the light emitting device and the invisible light detector increases, the intensity of the reflected light becomes weaker if a background of the target is farther, and the target is determined as the human face or head when the invisible light depth detecting information shows the target as being projecting out of two recessing sides.

* * * * *